United States Patent

[11] 3,626,328

[72] Inventors Leo Esaki
Chappaqua;
Webster E. Howard, Jr., Yorktown Heights; Raphael Tsu, Yorktown Heights, all of N.Y.
[21] Appl. No. 811,870
[22] Filed Apr. 1, 1969
[45] Patented Dec. 7, 1971
[73] Assignee International Business Machines Corporation
Armonk, N.Y.

[54] SEMICONDUCTOR BULK OSCILLATOR
14 Claims, 11 Drawing Figs.

[52] U.S. Cl. .......... 331/107 G, 317/234 V
[51] Int. Cl. .......... H03b 7/06
[50] Field of Search .......... 331/107; 317/234 (10)

[56] References Cited

UNITED STATES PATENTS

| | | | |
|---|---|---|---|
| 3,171,068 | 2/1965 | Denkewalter | 317/234 |
| 3,328,584 | 6/1967 | Weinstein | 250/206 |
| 3,356,866 | 12/1967 | Misawa | 307/88.5 |
| 3,467,896 | 9/1969 | Kroemer | 317/234 |
| 3,479,611 | 11/1969 | Sandbank | 331/52 |

*Primary Examiner*—John Kominski
*Attorneys*—Hanifin and Jancin and John E. Dougherty, Jr.

ABSTRACT: The semiconductor bulk oscillator includes a body of semiconductor material which includes a superlattice portion across which an electric field is applied. The device responds to this field to produce bulk high-frequency oscillations. The superlattice portion has a one-dimensional periodic spatial variation in its band edge energy produced either by doping or alloying. The periodic variation in band edge energy provides in wave vector space a plurality of minizones which are much smaller than the Brillouin zone. A cavity-type structure is formed transverse to the superlattice portion of the device to extract outputs of electromagnetic energy at high frequencies obtained when an electric field above threshold is applied across the superlattice.

INVENTORS
LEO ESAKI
WEBSTER E. HOWARD, JR
RAPHAEL TSU

BY [signature]

ATTORNEY

SEMICONDUCTOR BULK OSCILLATOR

BACKGROUND OF INVENTION

This invention relates to semiconductor bulk oscillators and, particularly, to semiconductor oscillators of the type which spontaneously exhibit current instability in response to an applied field. The current instability produces inherent high-frequency oscillations which are in that portion of the frequency spectrum between the highest microwave frequencies and the lowest infrared frequencies.

Prior Art

Pertinent prior art in terms of the basic theoretical considerations involved in the present invention is found in the book by Jean Brillouin, entitled "Wave Propagation in Periodic Structures," published by McGraw-Hill Book Company, Inc., in 1953. From an application standpoint, U.S. Pat. No. 2,975,377 issued on Mar. 14, 1961, to P. J. Price and J. W. Horton, is pertinent in the teaching relative to an oscillator device which employs interaction of carriers with the periodic potential associated with the crystalline lattice itself. Also pertinent is commonly assigned application Ser. No. 811,871, filed on even date herewith in behalf of L. Esaki, R. Ludeke and R. Tsu which is directed to the basic structure of superlattice devices, and DC negative resistance currents using such devices. Other art relating to bulk oscillators is as follows:

a. U.S. Pat. No. 3,365,583 issued on Jan. 23, 1968, to J. B. Gunn;
b. Copending and commonly assigned application Ser. No. 660,461, filed on Aug. 16, 1967, in behalf of J. C. McGroddy and M. I. Nathan.

SUMMARY OF THE INVENTION

Though there have been a large number of highly successful bulk oscillator devices developed in recent years, and some of these are capable of operation at very high frequencies, effort has continued to develop different and higher frequency oscillators, particularly in the high-frequency end of the microwave region. Further, semiconductor injection lasers have been developed which provide outputs in a significant portion of the infrared, but these devices when controlled by current require a junction, and the output frequency is controlled by the band gap of the particular semiconductor material used.

In accordance with the principles of the present invention, new bulk oscillators are provided which do not require a junction and can be operated to produce high-frequency outputs in the upper end of the microwave spectrum and extending into the infrared. The phenomenon employed in these devices involves the interaction of carriers with the periodic potential of a superlattice, and spontaneous current instability is produced in the bulk of the semiconductor.

This type of interaction is realized by forming in the semiconductor body what is here termed a superlattice. More specifically, a portion of the device is prepared to exhibit a periodic potential, different from that of a uniform crystal lattice, with which the carriers in the material can interact to produce the desired resistance and conductivity characteristics. The superlattice includes what is here termed a one-dimensional spatial variation in the band edge energy. More precisely, there is a one-dimensional spatial variation of the effective potential which prevails in the formulation of the dynamics of carriers in the system. The superlattice structure is achieved by forming a plurality of successive layers of semiconductor material with different energy band characteristics. A first and alternate layers exhibit a different band edge energy from the second and alternate layers. This is accomplished either by alloying or doping and the result is a one-dimensional periodic spatial variation in the band edge energy. Since the carriers need to interact with this varying energy structure, the period of the spatial variation is less than the mean free path of the carriers in the semiconductor. There are provided a sufficient number of these spatial periods to obtain the necessary interaction for the desired bulk oscillations. The period of the spatial variations is, however, sufficiently large that there is formed by this superlattice, in wave vector space $k$, a number of minizones which are much smaller than the Brillouin zones associated with the crystal lattice itself. These periodic minizones exhibit a periodic variation of the energy in wave vector space and when sufficient energy is imparted to increase the momentum of an electron such that it traverses a number of such minizones, spontaneous oscillations are produced.

Thus, it is an object of the present invention to produce a high-frequency semiconductor bulk oscillator.

Another object is to provide a semiconductor bulk oscillator which employs a superlattice structure, that is, a structure which exhibits in wave vector space a plurality of periodic minizones which are smaller than the crystalline Brillouin zones in a semiconductor.

A further object is to produce a bulk oscillator which provides outputs in that portion of the frequency spectrum at the high end of the microwave range and low end of the infrared range.

These and other objects, features and advantages of the invention will be apparent from the following more particular description of preferred embodiments of the invention, as illustrated in the accompanying drawings.

DESCRIPTION OF PREFERRED EMBODIMENTS

Figure 1:
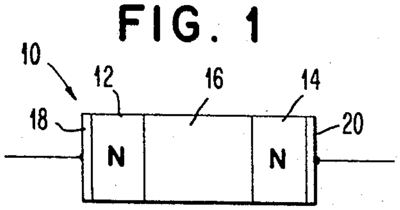
FIG. 1 is a schematic showing of a semiconductor device including a superlattice.

FIG. 1 is an illustration of a bulk semiconductor device including a superlattice. In this figure the entire semiconductor device is designated 10 and is shown to include two end portions 12 and 14 which are N-type separated by a central portion 16 which includes the superlattice structure. Two ohmic contacts 18 and 20 are made to the end portions and the connections for operating the device are connected to these ohmic contacts. The portion 16, which includes the superlattice, differs from the conventional semiconductors in that within this portion of the body there is a one dimensional spatial variation in the band edge energy. More specifically, this variation is in the direction along the length of the body between the contacts 18 and 20, and the band edge energy variation in the superlattice portion 16 does not vary in the other two dimensions.

Figure 1A:
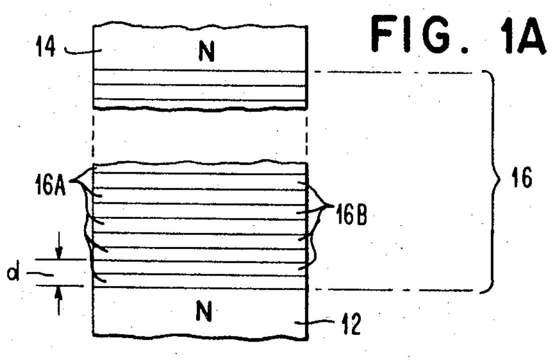
FIG. 1A is an enlarged representation of the layered structure of the superlattice portion of the device in FIG. 1.
Figure 2:
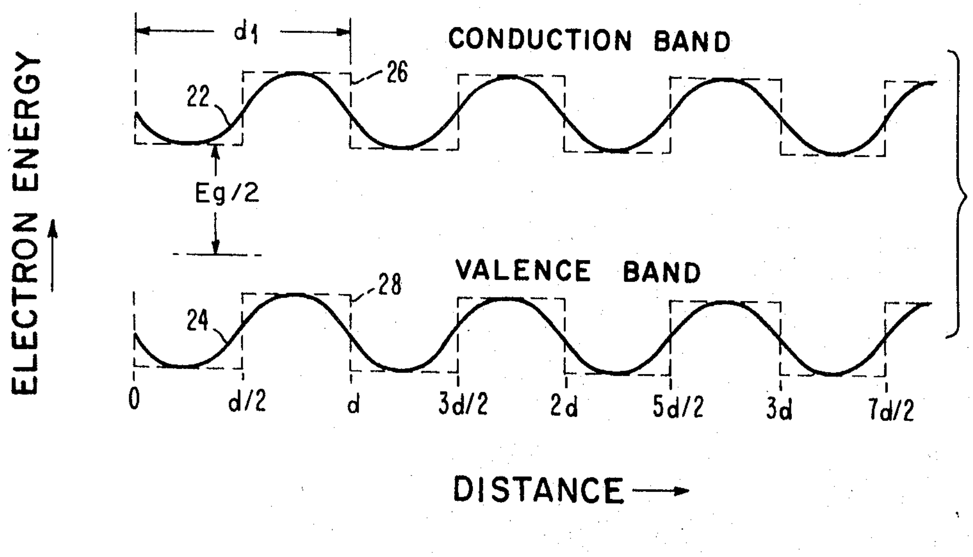
FIG. 2 is a representation of the energy diagram of the superlattice portion of the device of FIG. 1 when the adjacent layers are formed by doping.
Figure 3:
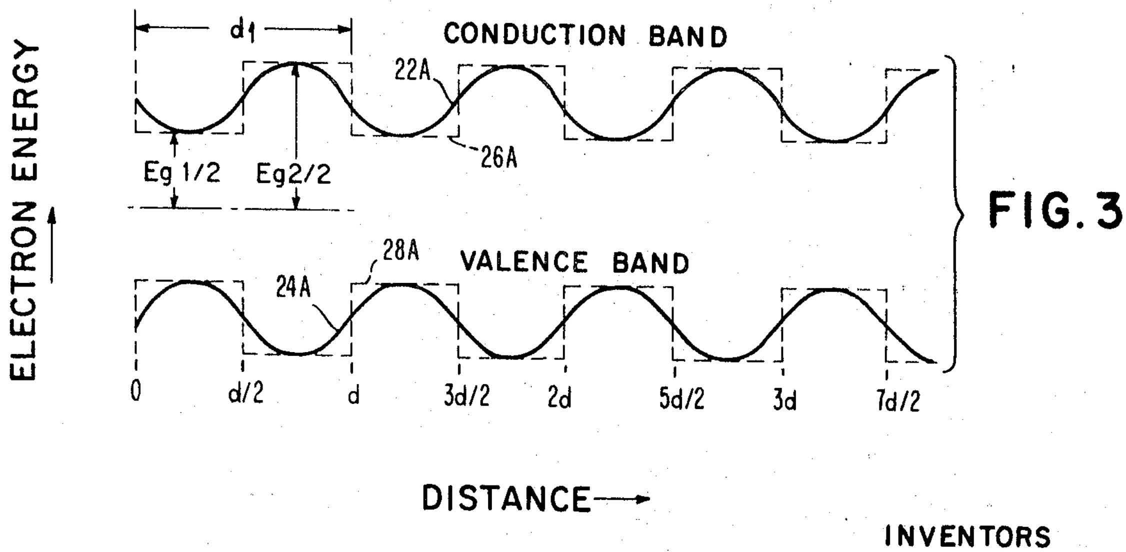
FIG. 3 is a representation of the energy diagram of the superlattice portion of the device of FIG. 1 when the adjacent layers are formed by alloying.

The physical structural arrangement within portion 16 is shown in more detail in FIG. 1A, and the band edge energy variations for devices prepared by doping and alloying are shown in FIGS. 2 and 3. In FIG. 1A, the portion 16 of the device is made up of a number of successive regions or layers. A first and alternate ones of these layers are designated 16*a* and the second and alternate layers, 16*b*. The layers 16*a* and 16*b* are not discrete separate parts of the body but together with end portions 14 and 16, are part of a single crystalline body. However, there are differences in the energy band characteristics of the successive layers 16*a* and 16*b* and the structure is formed by laying down successive layers in an epitaxial process. Therefore, it is considered proper to describe the structure in terms of these successive layers.

The layered superlattice structure of FIG. 1A is formed either by doping or by alloy techniques. When doping is employed, and considering germanium as a typical example of a material to be used, the lowermost portion of the semiconductor body as viewed in FIG. 1A is the N region 12, which is either a part of the original substrate of germanium on which the body is epitaxially grown, or itself is epitaxially grown on a substrate which is removed after the body was epitaxially formed. In any event, portion 12 is doped with an impurity such as phosphorus, antimony, or arsenic all of which are N-type impurities in germanium. Each of the layers 16*a* is epitaxially grown to be N-type ($10^{14}$–$10^{17}$ atoms per $cm.^3$) and each of the layers 16*b* is grown to be intrinsic. In such a case, the portion 16 is formed of a number of regions or layers alternating between N-type germanium and intrinsic germanium. Each of the layers 16*a* and 16*b* has the same width and each pair of layers forms one complete spatial period of the alternating layered structure. This spatial period is designated *d* in FIG. 1A. This value of the spatial period, hereinafter given in angstrom units, has an important bearing on the characteristics of the superlattice as will be evident from the description given below of FIGS. 4, 5 and 6. It suffices for the present to point out that the spatial period *d* is preferably between 50 and 500 angstroms; and, therefore, the thickness of the layers 16*a* and 16*b* is between 25 and 250 angstroms.

The layers 16*a* and 16*b*, when formed by doping, need not alternate between N type and intrinsic, but may be alternately N+ and N. The alternate layers may also be formed using N- and P-type impurities. The important consideration is the periodic band edge energy structure which is shown in FIG. 2. In this figure, there are shown the energy profiles for the edge of the valence band and for the lowest energy conduction band. Sinusoidal representations, shown in full line and designated 22 and 24, represent one type of profile and the dotted representations 26 and 28 in square waveform illustrate another type of profile. The ordinate of the plot of FIG. 2 is the distance along the length of the superlattice portion, and is plotted in terms of the value of the spatial period *d*. As shown in FIG. 2, *d* is the thickness of a pair of the alternating layers 16*a* and 16*b*. For each spatial period *d* there is a complete cycle of the variation in the band edge energy. The first spatial period formed by the lowermost two layers 16*a* and 16*b* as viewed in FIG. 1A, is represented by $d_1$ in FIG. 2 and is directly related to the square wave type of representations of curves 26 and 28. These curves assume that each layer 16*a* and each layer 16*b* is homogeneous throughout its thickness and there is an abrupt change in going from one to the other. However, though the temperature at which the body is grown is kept as low as possible to avoid diffusion between the layers, the curved representations 22 and 24 are considered to be more easily realized.

The band edge energy diagram as represented in FIG. 2 is characteristic of the semiconductor superlattice material. As can be seen from the figure, the band edge energy for the conduction band varies periodically with distance through the superlattice structure. The periodic variation is one dimensional along the length of the structure since there is no variation along the other directions within the layers. Further, it should be pointed out that the energy gap $E_g$ in FIG. 2 is essentially the same throughout the superlattice, and the periodic variation is in the electron potential.

As has been stated above, the superlattice structure formed by the alternating layers 16*a* and 16*b* may also be formed by alloying. If, as before, germanium is used as the substrate and the end portions 12 and 14 as viewed in FIGS. 1 and 1A are doped heavily to be N type, then the alternating regions 16*a* and 16*b* are typically germanium and an alloy of germanium and silicon. Specifically, the first and alternating layers 16*a* are formed of N-type germanium and the second and alternating layers 16*b* are formed by an alloy of germanium and silicon which can be represented as $Ge_{1-x}Si_x$. The germanium silicon alloy has a larger energy gap than the germanium itself, and the desired periodicity in the energy band structure is obtained as shown by curves 22A, 24A, 26A and 28A in FIG. 2.

Where germanium and germanium silicon alloy layers are used, a typical value for *x* in the alloy is between 0.1 and 0.2. Other examples of alloys that may be used are alloys of III–V and II–VI compounds. For example, the body may be primarily a gallium arsenide body with the N+ regions 12 and 14 highly doped to be N+ type gallium arsenide, the layer 16*a*, N-type gallium arsenide although not heavily doped N type, and the layer 16*b* the alloy $Ga_{1-x}Al_xAs$ where *x* would typically be between 0.1 and 0.4. The gallium aluminum arsenide alloy has a higher band gap than gallium arsenide itself and thus the desired periodic structure is achieved. The greater the value of *x* in such a structure, the greater is the fluctuation in the energy band edge. Another typical system is InAs and $In_{1-x}Ga_xAs$ in which case *x* can vary over very large values up to the point where the intermediate layer is completely gallium arsenide and x=1.0.

Relating the structure of FIG. 1A to the energy diagram of FIG. 3, the first two layers 16*a* and 16*b* immediately above the N+ portion 12 form one spatial period of the superlattice structure which extends on the energy diagram of FIG. 3 in the region represented as $d_1$. In FIG. 3, $Eg_1$ represents the band gap of the elemental layers 16*a* and $Eg_2$ represents the larger band gap of the alloy layers 16*b*. It should also be noted that the alloying may be carried out in such a way during the epitaxial growth that each of the layers 16*a* is an alloy as well as the layer 16*b*. In such a case, in the layer 16*a*, the value *x* is smaller than it is for the alloy in layer 16*b*.

The discussion to this point has been directed primarily to the spatial structure of the superlattice, i.e., the structure of the layers and the potential energy changes achieved along the actual length of the superlattice. Further, though an unspecified number of layers is shown in FIG. 1A, the energy band characteristics of FIGS. 2 and 3 show only a few of these layers, the reason being that the energy structure is repetitive. Each pair of layers added to the structure of FIG. 1A produces one more spatial period of the type shown in FIGS. 2 and 3. However, the number of layers and, therefore, the number of spatial periods is an important consideration in the design of actual devices. Generally speaking, there should be a minimum of 10 and preferably at least 20 such layers. Twenty layers, which is 10 spatial periods, provide sufficient interaction between the carriers and the superlattice structure to achieve the desired conductivity characteristics for the devices to embody the invention in this application.

It should also be pointed out here that though it has been broadly stated that the device shown in FIGS. 1 and 1A are prepared by epitaxial methods, great care must be exercised in the preparation of the layers 16*a* and 16*b* and this presents some difficulty where the individual layers are as thin as 25 angstroms. Thus, though the normal techniques of epitaxial growth from a vapor or solid solution may be applicable, it is preferable to form these epitaxial layers in a high-vacuum system. In such a case, the various constituents needed to form the layers are placed in separate boats and a shuttering system is employed to epitaxially grow the layers with the desired characteristics on the substrate.

Figure 4:
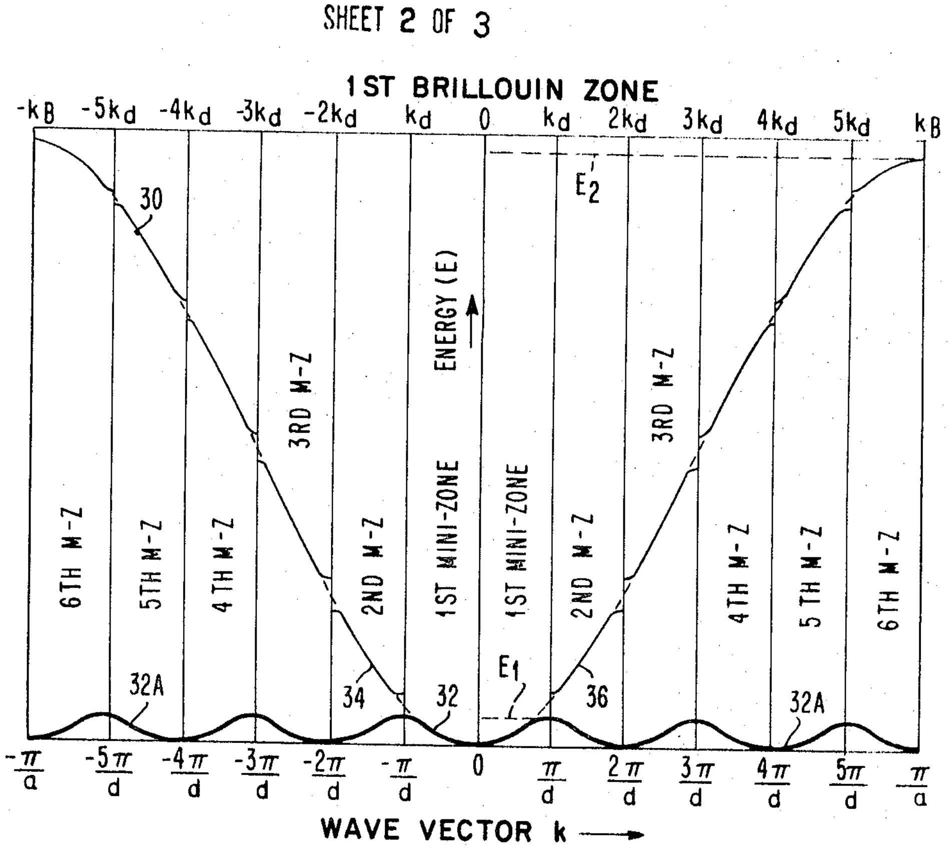
FIG. 4 is a plot of energy E versus crystal momentum or wave vector $k$ illustrating the energy band structure and the Brillouin zone associated with the crystal lattice itself as compared to the periodic energy band structure for the minizones of a superlattice structure.
Figure 5:
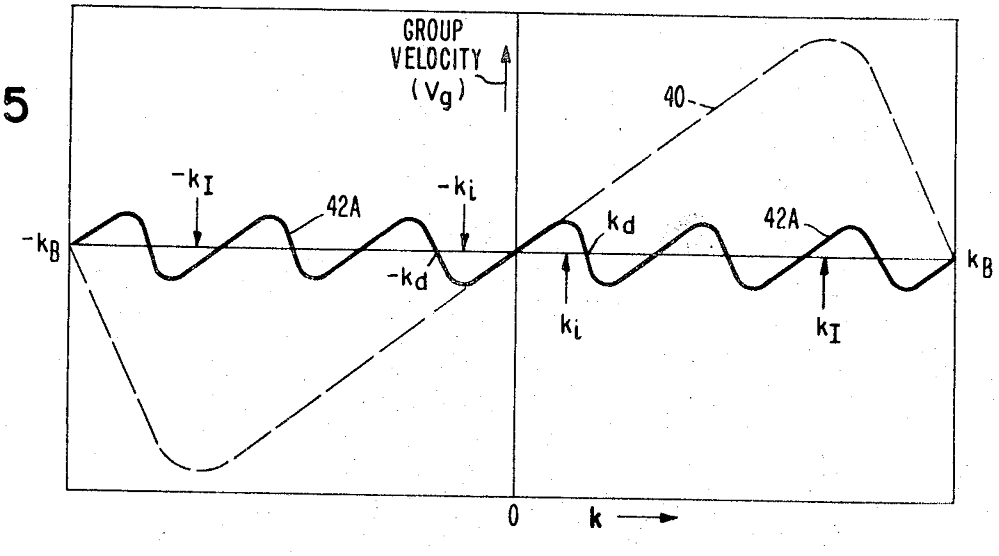
FIG. 5 is a plot of the instantaneous group velocity ($V_g$) of a carrier plotted against wave vector $k$ showing both the curve for the normal crystal structures and the periodic curve for the superlattice structure; the curves of FIG. 5 are the first derivatives of the curves of FIG. 4.
Figure 6:
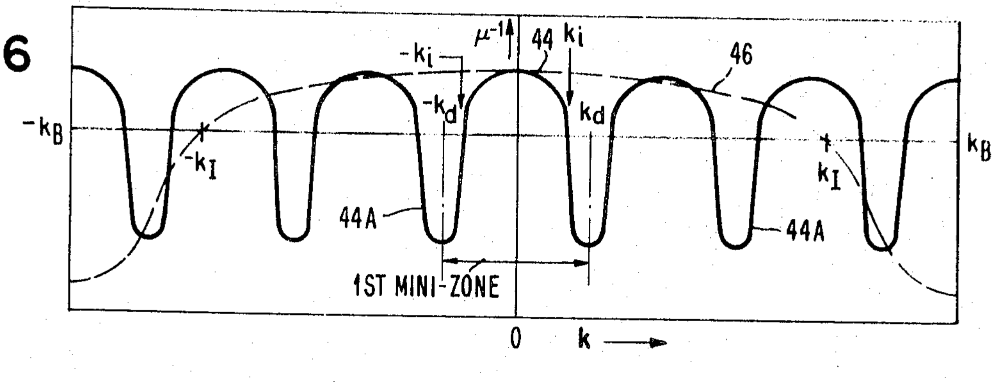
FIG. 6 is a plot of second derivative of the energy E of FIG. 4, which is proportional to inverse effective mass $\mu^{-1}$, versus wave vector $k$, and this plot also depicts a comparison of this characteristic for the normal crystal lattice with the periodic characteristic for a superlattice structure.

As has been discussed above, the superlattice is formed by a periodic variation of band edge energy structure along the length of the superlattice portion of the device. Further one spatial period of this variation has been termed $d$ and is preferably between 50 and 500 angstroms. However, to understand the energy wave vector relationships which are basic to the production of the bulk oscillations, reference must be made to the drawings in FIGS. 4, 5 and 6. In these figures, there are plotted certain characteristics of the superlattice relative to crystal momentum which is also called the wave vector $k$ in the material. The value $k$ is inversely proportional to actual electron wavelength in space. In FIGS. 4, 5 and 6, the value $k$ is plotted from a centrally located zero value in terms of $\pi/d$, wherein $d$ is the spatial period discussed above. At the extremities of the ordinate axis, the value $\pi/a$ is plotted where the value $a$ represents the normal lattice spacing $n$ in the semiconductor material. Typically, in materials of the type which have been discussed, germanium, gallium arsenide, etc., the normal lattice spacing is about 5 angstroms. In the plots of FIGS. 4, 5 and 6, the value $d$ is equal to 30 angstroms and, therefore, $\pi/d$ is one sixth of $\pi/a$. In the drawing of FIGS. 4, 5 and 6, the choice of the value $d$ to be 30 angstroms is dictated by an attempt to show graphically the proper relationships in momentum space between the superlattice structure and the actual lattice structure. In actual point of fact, as has been stated above, the minimum spatial period $d$ preferred for the practice of the present invention is about 100 angstroms.

In FIG. 4 there is plotted the energy E of the band structure for both a normal crystalline structure without a superlattice and for a crystalline structure prepared as described above to include a superlattice. Considering the case of the actual lattice first, the single continuous curve 30 which is dotted in places and extends from the upper left-hand portion of the drawing down through zero and back up to the upper right-hand portion represents the normal energy structure. This is the typical curve for what has been called in the past a Brillouin zone and the zone extends from $\pi/-a$ to $\pi/+a$.

When a superlattice is added to the structure as described above, with the value $d$ being six times the value $a$, actually a plurality of what are here termed minizones are produced in the material. The curve in the central one of these minizones is designated 32 and is shown in heavier line than the remaining portions of the drawing. This curve represents the energy band structure for the lowest energy band in the superlattice. There is a termination of the energy curve at each value of $\pi/d$ for the minizone structure and a new band at a somewhat higher energy exists in the next zone. The dotted line representation crossing the boundaries of each of these zones indicates the shape of the continuous curve which exists in a normal crystalline lattice without a superlattice structure. However, the same low-energy curve 32 can be considered to repeat itself cyclically through the zones, as shown by the periodic extensions of this curve which are designated 32A. Further, there is a separation in energy at $\pi/d$ and at the other minizone boundaries between the upper portion of the low-energy band in that zone and the next higher energy band beginning in the next minizone. The width of this energy gap at the end of the first minizone, as shown in FIG. 4, i.e. between the full line curve 32 and the curves 34 and 36 in the second minizone is a consideration in the practice of the present invention. The width of this gap is determined by the amplitude of the variation in the band edges as shown in FIGS. 2 and 3. As the amplitude of the periodic variation is increased, the energy gap between the upper energy state of curve 32 and the energy bands represented by curves 34 and 36 is increased. This results in a decrease in tunneling probability from the lower band 32 to the higher bands 34 and 36. This type of tunneling is avoided in the devices of the present invention.

From the curve of FIG. 4, it is apparent that the superlattice structure provides, in momentum space, instead of one Brillouin zone, a plurality of much smaller minizones. It is further apparent that as the value $d$ is made larger, more minizones within one Brillouin zone are provided. Since $d$ increases as the thickness of the layers 16$a$ and 16$b$ (FIG. 1A), is increased, it might seem that $d$ should be very large. However, $d$ cannot be so large as to be greater than the mean free path of carriers, and, in fact, to produce bulk oscillations, the value of $d$ should be significantly less than the carrier mean free path, e.g. smaller by a factor of at least 5 and probably 10 . These conditions are most easily realized with present day technology at low temperatures. Therefore, the device can be operated at liquid nitrogen or even liquid helium temperatures using cooling apparatus which is now well known in the art.

The basis for the spontaneous bulk oscillations becomes more apparent upon examining FIGS. 5 and 6. In FIG. 5, the group velocity $V_g$ of a carrier is plotted with respect to $k$. In this figure, the dotted representation 40 is for a normal lattice structure and the full line curve 42 is for the superlattice structure. Curves 40 and 42 are actually the first derivatives of the curves for the Brillouin and minizones shown in FIG. 4. As in FIG. 4, the group velocity curve 42 for the first minizone is repeated in FIG. 5 by the curves 42A to illustrate the periodic nature of the characteristic. The second derivatives of the curves of FIG. 4 are plotted in FIG. 6 against $k$. The second derivative is proportional to the inverse of the effective mass $\mu^{-1}$ of the carriers and in FIG. 6 the full line representation of curves 44 and 44A represents the characteristic for the minizone whereas the dotted curve 46, again shown for comparison purposes, is the inverse mass characteristic for the Brillouin zone in a normal crystal lattice.

From an examination of the curves of FIGS. 4, 5 and 6, a number of differences between the actual crystal characteristics and the superlattice characteristics become apparent. First, the period in $k$ space ($2\pi/d$) for the superlattice is much less than the period in $k$ space for the actual lattice $2\pi/a$. Further, the maximum characteristics for the superlattice in energy E (FIG. 4) and group velocity $V_g$ (FIG. 5) occur at much smaller values of $k$. Also, as is shown in FIG. 6, the mass of the carriers (electrons in preferred N-type material) in the superlattice increase much more quickly in $k$ space than would be the case in a normal lattice structure and the mass actually becomes negative within the minizones. Since the electrons are primarily in the lowest energy band in the superlattice represented by curve 32 in FIG. 4, and insofar as the interaction of electrons is concerned, this curve can be considered repetitive, as shown by curve 32A, the energy ($E_1$) of the highest energy state in the band of the superlattice curve 32 being much lower than the maximum energy ($E_2$) of the highest energy state of a band of the normal lattice curve 30. One of the severe limitations on practically realizing the characteristics exemplified by the curves in FIGS. 4, 5 and 6 for a normal crystal lattice structure is that the scattering time within the semiconductor material is sufficiently limited that the electrons actually scatter before the states can be achieved which would produce the desired characteristics. This limitation is overcome with the novel superlattice structure, where though the scattering time is roughly the same, the establishment of the minizones makes it possible to achieve the desired characteristics within the scattering time of the carriers.

Thus, when an electric field is applied to the device of FIG. 1, with the superlattice structure shown, the electron group velocity, as shown by curve 42 in FIG. 5, initially increases roughly in a linear fashion. After a maximum velocity is achieved at $k_i$ in momentum space, the curve shows a velocity decrease which continues until $k_d$. The velocity decrease, as shown by curve 44 in FIG. 6, is accompanied by a change in the mass of the electrons from positive to negative. These changes are the basis for the DC negative resistance exhibited by a superlattice device, and devices using this DC negative resistance are disclosed in the above-mentioned copending application Ser. No. 811,871.

The basis for the devices exhibiting inherent bulk oscillations is most clearly shown by the curves 42 and 42A in FIG.

5. As there shown at the value of $k$ equal to $\pi/d$ the electron velocity becomes negative, that is the electron actually begins to be moved in a direction opposite to that of the applied field. Further, this change in electron velocity continues on a periodic basis as $k$ is increased, with the velocity first reaching a maximum in one direction, then decreasing toward zero and then attaining a maximum in the opposite direction. It is clear that a number of electrons undergoing these periodic changes in direction produce a spontaneous oscillatory current. It is also equally clear that for this current oscillation to be appreciable, it is necessary that the scattering time be sufficient that the electrons, on an average, undergo a few complete oscillations before scattering.

If the scattering time is designated $\tau$ and $\omega$ is $(2\pi)$ times the frequency of oscillation then the product $(\omega\tau)$ must at the very least be greater than $2\pi$, and probably higher. When $\omega\tau=2\pi$, an electron on the average completes one oscillation before it is scattered. The frequency of oscillation and, therefore, the value of $\omega$ is dependent upon the applied electric field applied across the superlattice. The relationship is as follows:

$$\omega=eFd/h \text{ where}$$

$e$ = electron charge
$f$ = applied field
$d$ = the spatial period
$h$ = Plank's constant/$2\pi$ Thus, the frequency of oscillation increases as the electric field is increased. Further, the limiting condition in terms of achieving oscillations, that is $\omega\tau>2\pi$ can be stated in terms of these same parameters, as:

$$eF\tau d/h>2\pi$$

Figure 7:
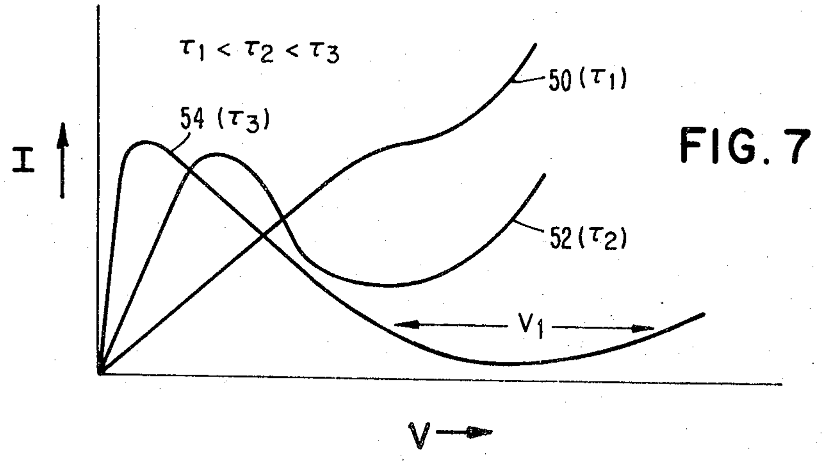
FIG. 7 is a plot of the I–V characteristic for a superlattice device illustrating the effect of the scattering time on this characteristic.

FIG. 7 shows a number of voltage-current characteristics which illustrate the effect of the scattering time $\tau$ on the characteristics of the device. In this figure there are three curves designated 50, 52 and 54 which represent the DC current voltage characteristic for three different values of scattering time $\tau_1$, $\tau_2$, and $\tau_3$, where $\tau_1<\tau_2<\tau_3$. Although the characteristics are DC characteristics and the device described is a bulk oscillator, the curves are useful in illustrating the effects of the parameters on the device characteristics as well as the range in which the bulk oscillator devices should be operated. Curve 50 ($\tau_1$) illustrates the V–I characteristic for a low value of $\tau$, that is where the scattering time is so small that no appreciable negative resistance is realized. Curve 52 ($\tau_2$) is for a value of $\tau$ which is sufficient for DC negative resistance devices but which is not satisfactory for significant inherent bulk oscillations. Curve 54 ($\tau_3$) illustrates the V–I characteristic for the larger values of scattering time necessary for the bulk oscillators of the present invention. Generally speaking, the minimum value of $\tau$ for a bulk negative resistance device is about one sixth the minimum value of $\tau$ for a bulk oscillator device. These curves illustrate that as $\tau$ is increased the threshold voltage for the onset of negative resistance is decreased. Further, the value of voltage in the higher voltage range at which the scattering (and hot electron effects) begin to dominate and cause the device to again exhibit positive resistance also increases with increasing values of $\tau$. Therefore, as shown by the curve 54 ($\tau_3$) for the high value of $\tau$ there is a wider range of voltage (flat portion of the curve designated $V_1$)) over which the DC current remains relatively unchanged. It is in this range in which the bulk oscillation device is operated, and preferably in the higher end of the range since the frequency of the oscillations, and therefore, $\omega\tau$, increases as the voltage is increased. However, the voltage cannot be raised so high that the tunneling becomes so great that the oscillations are diminished or eliminated. The scattering time $\tau$ can be increased by lowering the temperature at which the device is operated, which is to liquid nitrogen or even liquid helium temperature. When operated in the voltage range $V_1$, the devices exhibit a spontaneous oscillating current characteristic about the DC current value. This oscillation in current is due to the inherent instability in the material, produced by the interaction of the carriers with the periodic potential of the superlattice, and is not dependent upon a feedback or load resistance as is the case with oscillators which employ the DC negative characteristic.

The curve of FIG. 7 is helpful in understanding the voltage range in which the bulk oscillator should be operated but, of course, is limited to a showing of the DC current-voltage characteristic. The amplitude of the applied voltage is, for example, located centrally in the range $V_1$ of FIG. 7. When the voltage is applied, current oscillations are produced as shown in FIG. 2 at a frequency which is determined by the characteristics of the superlattice (e.g., value of spatial thickness) and the intensity of the electric field across the superlattice. Due to scattering and tunneling effects, the DC value of the current in FIG. 2 rises with time. The current oscillations are produced about the slowly increasing DC current value. The frequency of the oscillations is in the range of $10^{11}$ cycles/sec. to $10^{13}$ cycles/sec. Further the oscillations may become smaller due to scattering and the results of tunneling which would begin to destroy coherence. The long term coherence may be improved by placing the device in a cavity.

Figure 8:
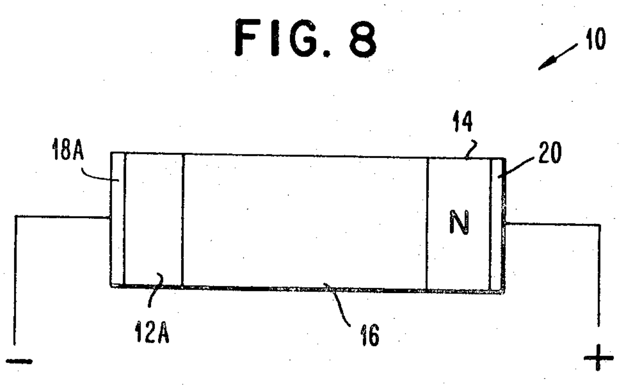
FIG. 8 is a schematic showing of another embodiment of the invention designed primarily for pulsed operation.

FIG. 8 shows another embodiment primarily designed for pulse operation in which the reference numerals correspond to those of FIG. 1 with the letter A appended where the structure is different. Regions 18A and 12A form a blocking contact to the superlattice portion 16. This is specifically designed for high coherence pulse operation. The function of the blocking contact is to prevent continuous injection of electrons after the operation has been initiated. Continuous injection can, in some cases, produce out of phase components. The blocking contact to the superlattice may be an MOS type structure in which in region 12A is an insulator. The same type of function can be achieved by eliminating region 12A and making contact directly between electrode 18A and the superlattice, with the contact being a rectifying contact. Finally, a PN-junction can also be used as a blocking contact. In each of these embodiments using a blocking contact a thin N+ region may be interposed at the boundary between the superlattice and the blocking contact, e.g., in FIG. 8, between region 12A and superlattice 16. The function of the N+ region is to provide a source of electrons for the initial injection when the pulse is applied. In all cases using the blocking contact type of arrangement polarity must be as shown with the negative terminal connected to the blocking contact side of the device.

Figure 9:
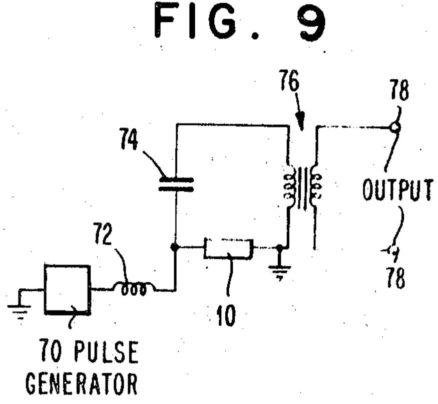
FIG. 9 is a circuit diagram for pulse-type operation of the superlattice device.

FIG. 9 is a diagrammatic representation of an oscillator circuit embodying the bulk oscillator 10 of the present invention. In this circuit, the voltage pulse which produces the oscillation is applied by a voltage source 70 through an inductance or choke 72 to a terminal in a loop which includes the bulk oscillator 10, capacitance 74 and inductance 76. The high-frequency output is coupled out of the loop to a pair of output terminals 78. Though the circuit diagram of FIG. 9 shows the various elements as discrete elements, the circuit is preferably built using microwave structures and the capacitance 74 and inductance 76 represent the distributed values of inductance and capacitance in the microwave structure. When a voltage pulse is applied by generator 70, the pulse passes through the choke 72 and is applied across bulk oscillator 10. High-frequency current oscillations are then produced and even though there is a rise in the DC value of current only the high-frequency component is coupled to the output. The choke 72 has a value of inductance such that it does not transmit the high-frequency current in the loop.

Figure 10:
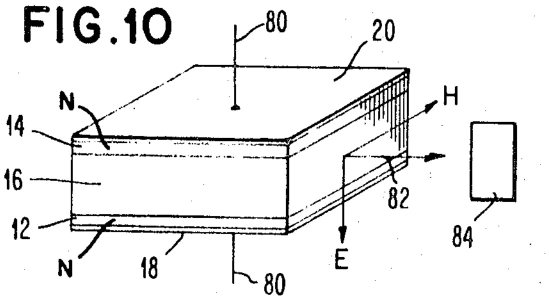
FIG. 10 is a schematic diagram of an embodiment of the invention designed to provide high-frequency radiative outputs.

Another embodiment of the invention is shown in FIG. 10 in which the output is taken in a direction transverse to the DC current through the device. The device 10 is shown in FIG. 11 using the same reference characters as are used in FIG. 1 but the structure described with reference to FIG. 8 may also be employed, particularly for pulse-type operation. A voltage pulse is applied between terminals 80 to the 2 ohmic contacts 18 and 20 to produce the current oscillations in the manner described above. These oscillations produce oscillations in magnetic and electric fields in a direction transverse to the current flow and these field oscillations are radiated out of the sides of the device as indicated by arrow 82 to an output or sensing device 84. The radiative output, whether its frequency is high microwave or low infrared, can be coupled out of the device using appropriate transmission structures, such as waveguides or fiber optics. The output may be radiated in much the same way as the output of an injection laser or electroluminescent diode particularly when the output frequency is in the infrared. Also, for outputs in this frequency range, Fabray-Perot-type structures may be employed, as well as reflective and antireflecting coatings on the surfaces of the superlattice structure to enhance the radiation output in a particular direction. Further, these and other types of techniques can be employed to couple energy back into the device and thereby maintain the coherence of the oscillations.

The discussion to this point has been primarily concerned with N-type devices in which the excess carriers are electrons. The invention can also be practiced using P-type structures in which the carriers are holes. Further, stress can be applied to such devices to enhance the desired characteristics for the bulk oscillations. As has been pointed out above, the desired values for mean free path and scattering time are such that at this stage of the technology, operation may be most easily achieved at reduced temperatures such as, for example, liquid nitrogen or liquid helium temperatures.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A semiconductor oscillator comprising:

a. a body of semiconductor material at least a portion of which extending in one direction includes a superlattice structure;

b. said superlattice portion having a periodic variation in the electronic and physical character of the semiconductor material along the length thereof in said one direction for a plurality of spatial periods resulting in a spatial periodic variation in band edge energy and the production of minizones in $k$ space which are smaller than the Brillouin zone in said material, and;

c. means for applying to said superlattice portion a voltage in a range sufficient to produce bulk high frequency oscillations in said superlattice.

2. The oscillator of claim 1 wherein said oscillations are high-frequency current oscillations produced within the superlattice itself in response to the applied voltage by the interaction of carriers in the superlattice with the periodic potential of the superlattice.

3. The oscillator of claim 1 wherein said superlattice portion exhibits a direct current I–V characteristic which includes a positive going portion, followed by a negative going portion which includes a relatively flat portion, and a negative going portion, and said applied voltage is in the range of said relatively flat portion of said I–V characteristic.

4. The oscillator of claim 1 wherein the frequency $f$ of the oscillations increases with increasing applied voltage and the applied voltage is sufficiently large that the product of the scattering time $\tau$ and $\omega$, which is $2\pi f$, is greater than $2\pi$.

5. The oscillator of claim 1 wherein said body including said superlattice portion includes two contacts for applying a voltage to said superlattice, and one of said contacts is a blocking contact.

6. The oscillator of claim 5 including means for applying voltage pulses to said contacts to produce said bulk oscillations on a pulsed basis.

7. The oscillator of claim 1 wherein said oscillator includes two contacts on either side of said superlattice portion, said voltage is applied between said contacts and said frequency current oscillations are produced in a first direction extending through said superlattice between said contacts, said current oscillations producing an electromagnetic wave output which is transmitted in a direction at right angles to said first direction through the side of said superlattice, and including means responsive to said electromagnetic wave output.

8. The oscillator of claim 1 wherein said superlattice is entirely of one conductivity type.

9. A semiconductor oscillator comprising:

a. a body of semiconductor material at least a portion of which extending in one direction includes a superlattice structure;

b. said superlattice portion having a periodic variation in the electronic and physical character of the semiconductor material along the length thereof in said one direction for a plurality of spatial periods;

c. means for applying a constant voltage signal across such superlattice portion to bias such superlattice portion to a voltage within a range of voltages at which said superlattice portion exhibits a spontaneous current instability which is manifested by spontaneous bulk high frequency current oscillations in said one direction;

d. an output means responsive to said high-frequency oscillations.

10. The oscillator of claim 9 wherein said output means is coupled electromagnetically to said oscillator.

11. The oscillator of claim 9 wherein said inherent current oscillations in said one direction produce a high-frequency electromagnetic output which is radiated from said body in a second direction to said output means.

12. A semiconductor oscillator comprising:

a. a body of semiconductor material at least a portion of which extending in one direction includes a superlattice structure;

b. said superlattice portion having a periodic variation in the electronic and physical character of the semiconductor material along the length thereof in said one direction for a plurality of spatial periods resulting in a spatial periodic variation in band edge energy and the production of minizones in $k$ which are smaller than the Brillouin zone in said material, and;

c. means for applying to said superlattice an electric field producing voltage in a range in which said superlattice responds by spontaneously producing bulk oscillations; said oscillations being at a frequency dependent upon the applied voltage and being produced spontaneously and independently of a load connected to said body including the superlattice.

13. The oscillator of claim 12 wherein the value of the spatial period $d$ is no greater than one-fifth the carrier mean free path in said superlattice.

14. The oscillator of claim 13 wherein the value of the spatial period $d$ is no greater than one-tenth the carrier mean free path in said superlattice.

* * * * *